United States Patent Office 3,411,954
Patented Nov. 19, 1968

3,411,954
METHOD OF MAKING ELECTRODES
Peter D. Richman, Park Ridge, N.J., assignor, by mesne assignments, to Leesona Corporation, Warwick, R.I., a corporation of Massachusetts
No Drawing. Filed Sept. 30, 1965, Ser. No. 491,825
8 Claims. (Cl. 136—120)

This invention relates to a novel process for the construction of electrodes for use in an electrochemical device such as a fuel cell and to the electrodes made by the novel process. More particularly, the invention embraces a process for the construction of low thickness, lightweight electrodes having low internal resistance. Essentially the process comprises constructing electrodes by depositing a uniform suspension of an electrochemically reactive catalyst and a non-wettable material upon a substrate. The liquid is removed from the substrate and the resultant cake is pressed into the openings in a metal support. The composite structure, consisting of the substrate, catalyst-non-wettable material cake and metal support is sintered sufficiently to bond the hydrophobic polymer particles. The sintering serves to join the cake and wire into a mechanically stable unit and to open the structure by shrinkage of the hydrophobic polymer, enabling the supporting substrate to be removed. For convenience hereinafter, the process for preparing electrodes will be described with emphasis being placed on the use of the electrodes in a fuel cell. However, as will be apparent, the electrodes of the process can be employed in other electrochemical devices where similar considerations apply.

In the prior art, the advantages of lightweight electrodes for use in fuel cells have been recognized. These electrodes comprise a porous metal support in intimate contact with a catalytic material such as a dispersion of metal black and hydrophobic polymer. The electrodes being extremely thin, have low internal electrical resistance and, furthermore, require a small amount of space permitting the construction of highly compact cells having a high energy to volume and energy to weight ratio. Electrodes of the aforesaid variety are difficult to construct, particularly in large sizes, due to their extreme thinness and the delicate nature of the catalytic layer. It has been found to be difficult to obtain a uniform coating of the catalyst and polymer throughout the metal support and to obtain consistent reproducibility.

Accordingly, it is an object of the present invention to provide an improved process for the construction of thin, lightweight electrodes having high structural strength wherein the catalyst is uniformly applied.

It is another object of this invention to provide thin, lightweight electrodes which have high structural strength and which are reproducible.

These and other objects of the invention will become more readily apparent from the folowing detailed description, with particular emphasis being placed on the working examples.

The objects of the present invention are accomplished by forming a suspension of a finely divided catalytic material and particles of a non-reactive hydrophobic polymer. The suspension is thereafter applied uniformly to a porous substrate and the liquid removed by evaporation or by drawing the liquid through the porous substrate by suction. The substrate supporting the cake of catalytic material and hydrophobic polymer is pressed into the openings and around a metal support. The composite metal support, catalytic material and substrate is placed in a suitable furnace and heated sufficiently to sinter the hydrophobic polymer. The sintering further serves to join the cake and metal support into a mechanically stable unit and to open the structure by shrinkage of the hydrophobic polymer which enables the supporting substrate to be removed. The supporting substrate is removed and the electrode is ready for use. The resultant electrode is extremely thin, light in weight, and possesses a high degree of mechanical integrity even after extended periods of operation in a fuel cell. More critically, however, the electrodes made according to the present invention are highly reproducible.

According to the present invention, the metal support can be a metal screen, expanded metal, metal felt, or mesh. It is essential that the support be electrically conductive and able to withstand the corrosive environment of a fuel cell. Suitable metal supports, which are preferably from 0.2 to 4 millimeters thick with the mesh size being from 20 to 400 are composed of nickel, copper, iron, tantalum, titanium, zinc, gold, silver, platinum, palladium, osmium, and the alloys thereof. Primarily from a standpoint of their excellent resistance to heat and the corrosive environment of the cell, and their relative inexpensiveness, nickel, titanium, and tantalum supports are preferred.

The catalytic metal which is applied to the metal support as a dispersion with the hydrophobic polymer can be composed of virtually any material which will favorably influence an electrochemical reaction such as copper, gold, nickel, silver, cobalt, and the like. However, because of their exceptional characteristic of catalyzing an electrochemical reaction, the Group VIII metals of the Mendelyeev's Period Table are preferred, i.e., platinum, ruthenium, palladium, osmium, iridium, and rhodium. The catalytic metal is preferably employed in a very finely divided state in order to provide as large a reactive electrode surface as possible. Thus, metals such as palladium and platinum are preferably employed as the co-called metal blacks.

The polymer which is dispersed with the catalytic metal and which is applied to the metal support must be relatively hydrophobic. Thus, exemplary polymers include polystyrene, polyethylene, polytrifluoroethylene, polyvinylfluoride, polyvinylidenefluoride, polytrifluorochloroethylene, and co-polymers thereof. Because of its exceptional hydrophobicity, as well as its resistance to heat and the corrosive environment of the electrolyte, polytetrafluoroethylene is preferred.

The porous substrate upon which the catalytic material is to be deposited can be any of various materials, it only being essential that the water of the suspension can be removed by evaporation, or by drawing the water through the substrate. Thus, exemplary materials are cellophane, Kraft paper, asbestos paper, polymeric materials such as polyurethane foam, porous polyethylene, porous polystyrene, porous polyvinylchloride, and the like. Because of its availability and inexpensiveness, Kraft paper is preferred. Further, it may be desirable, depending upon the substrate selected, to previously treat the material in order that the catalytic layer can easily be removed. For example, a porous Kraft paper substrate preferably is treated by drawing a solution of polytetrafluoroethylene or the like through the paper by means of a vacuum. The treated paper more readily permits the withdrawal of the suspending medium and, further, is more easily removed from the catalytic layer.

The admixture of catalytic metal and hydrophobic polymer can be formed employing numerous methods with it only being essential that the polymer be uniformly distributed throughout the catalytic layer, permitting its uniform application to the substrate. One preferred method is to suspend the polymer and catalytic material in a suitable medium such as water, organic solvent, or the like and apply the catalytic material to the substrate and remove the final traces of the suspending medium. It has been found that a particularly uniform admixture of the catalytic metal and hydrophobic polymer can be obtained if a precious metal black is precipitated onto hydrophobic particles suspended in a suitable medium. A solution of a salt of the catalytic metal black initially is chemically reduced to the noble metal black on the hydrophobic polymer. For example, platinum black is precipitated on polytetrafluoroethylene (PTFE) particles suspended in an aqueous medium by the addition of a chemical reducing agent (e.g., hydrazine). The medium initially contained ionic platinum which is chemically reduced to platinum black when the material is deposited. The inert particles such as polytetrafluoroethylene serve as a nucleus. Alternatively, a mixture of a black-PTFE suspension can be made by violent agitation in water.

The ratio of polymer to catalytic metal in the dispersion is not critical. Normally, the desideratum is to have as light a load of the catalytic metal as possible, but with a high surface area exposed for electrochemical reaction. In this manner, the cost of the electrode is kept low. In the usual construction, the catalytic metal-polymer admixture will contain from about 90 to 55 percent metal and from 10 to 45 percent polymer on a weight basis. The optimum percentages is from about 65 to 80 percent metal and from about 35 to 20 percent polymer on a weight basis.

Although the heating of the electrode structure at elevated temperatures to sinter the polymer particles to obtain bonding is essential to obtain an electrode with high mechanical stability and to remove the porous substrate, the temperature of the sintering and the time of the operation can vary over a substantial range. Thus, normally, the temperature of the sintering operation will be from about 180 to 325° C. for periods varying from 5 to 45 minutes. Inasmuch as there is a direct relationship between time and temperature, within limits, if the temperature is increased, the time of the sintering operation can be reduced. It has been found, however, that greater reproducibility is obtained if the temperature is maintained between 220 and 300° C. for periods of about 10 to 35 minutes.

The electrodes of the present invention can be employed in fuel cells operated with a variety of acid and alkaline electrolytes such as sulfuric acid, phosphoric acid, potassium hydroxide, sodium hydroxide, etc. Moreover, the electrodes can be employed as either the anode or cathode of the fuel cell. By judiciously selecting the activating metal of the catalytic layer, the electrodes of the present invention can be tailored to be particularly suitable for any specific fuel including hydrogen, the carbonaceous materials, and ammonia. Additionally, metals such as silver and gold in the catalytic layer provide excellent electrodes for use as a cathode operated on air as the oxidant.

Moreover, because of their excellent mechanical integrity, the presently described electrodes can be utilized in fuel cells operating in a wide temperature range. One of the outstanding features, however, is the ability of the subject electrodes to be used at low temperatures and still provide reasonable current densities. Preferably, therefore, the present electrodes will be employed in fuel cells operated at temperatures of from about 25 to 150° C. The cells can be operated, however, at temperatures as high as about 700° C., it being understood that generally the higher the temperature, the greater the electrochemical reactivity. It is apparent, however, that at higher temperatures ancillary problems such as insulation of the cell and the like are increased.

Having described the invention in general terms, the following example is set forth to more particularly illustrate the invention. Parts are by weight unless otherwise specified.

Example

A dispersion of platinum black and polytetrafluoroethylene (PTFE) was prepared by precipitating finely divided platinum onto the PTFE particles in an aqueous solution by the addition of hydrazine. The suspension comprised, on a weight basis, 15 percent polytetrafluoroethylene and 85 percent platinum. The suspension was allowed to settle upon a previously treated porous matrix. The treated matrix comprised kraft paper, which had been treated by drawing a suspension of PTFE through the pores under vacuum. Water was drawn from the platinum-PTFE suspension by vacuum means leaving a cake of the catalytic material. The cake and substrate was then pressed into and upon a 100 mesh nickel screen having a wire diameter of 0.002 inch and a weight of 14.4 mg./cm.$^2$. The entire structure was heated in a draft furnace at 650° F. for 40 minutes. The sintering served to join the cake and wire into a mechanically stable unit and opened the structure by sintering of the PTFE particles, enabling the supporting paper substrate to be removed.

After removal of the porous substrate, two identical electrodes as prepared above were tested in a fuel cell and fed with pure hydrogen and air at 25° C. The electrolyte was a 30 percent aqueous solution of potassium hydroxide. The cell provided a current density of 200 amps. per square foot at 0.65 volt.

In the aforesaid example, the metal support screen can be replaced with other metal supports including titanium, tantalum, copper, silver, gold, iron, and palladium. Additionally, the metal of the catalytic layer can be replaced by other electrochemically active materials including nickel, copper, gold, silver, palladium, ruthenium, and rhodium. The hydrophobic polymer can be replaced with other polymers including polystyrene, polyethylene, polytrifluoroethylene, polyvinylfluoride, polyvinylidenefluoride, polytrifluorochloroethylene, and co-polymers thereof. As will be apparent to one skilled in the art, the illustrative example is only set forth as a preferred embodiment of the invention. However, the invention is not to be construed as limited thereby. It is possible to produce still other embodiments without departing from the inventive concept herein described and such embodiments are within the ability of one skilled in the art. Furthermore, as will be apparent to those skilled in the art, while the invention has been described with reference to fuel cells, it is possible to employ the aforesaid electrodes in other electrochemical devices.

What is claimed is:

1. The method of constructing a lightweight electrode comprising the steps of applying a liquid suspension of a catalytic material including a catalytic metal and a hydrophobic polymer particle to a porous substrate, drawing the liquid medium through the substrate for removing the liquid suspending medium from said catalytic metal and hydrophobic polymer, disposing of a porous metal support on said treated substrate, pressing said metal support on said treated substrate to effect penetration of the catalytic material about said support, heating said composite of metal support, catalytic material, and substrate at a temperature sufficient to bond the hydrophobic polymer particles to each other and to said metal support, and thereafter removing said substrate.

2. The method of claim 1 wherein the porous substrate is pre-treated prior to applying the liquid suspension thereto by drawing a suspension of hydrophobic polymer through the pores of said substrate.

3. The method of claim 1 wherein the porous substrate is kraft paper.

4. The method of claim 1 wherein the catalytic material was prepared by precipitating finely divided platinum onto polytetrafluoroethylene particles in an aqueous solution by the addition of hydrazine.

5. The method of claim 1 wherein the hydrophobic polymer is polytetrafluoroethylene.

6. The method of claim 1 wherein the catalytic metal is platinum.

7. The method of claim 1 wherein the suspension is prepared by precipitating the catalytic metal upon the hydrophobic polymer.

8. The method of claim 1 wherein the substrate is kraft paper which was previously treated with polytetrafluoroethylene.

References Cited

FOREIGN PATENTS 938,708  5/1961  Great Britain.

ALLEN B. CURTIS, *Primary Examiner.*

N. P. BULLOCH, *Assistant Examiner*